United States Patent [19]

Garrigue et al.

[11] Patent Number: 5,034,500

[45] Date of Patent: Jul. 23, 1991

[54] PROCESS FOR THE MANUFACTURE OF UREA-FORMALDEHYDE RESINS

[75] Inventors: Roger Garrigue; Jack Lalo, both of Toulouse; Jean-Luc Leclere, Miremont, all of France

[73] Assignee: Norsolor (Orkem Group), Paris, France

[21] Appl. No.: 289,103

[22] Filed: Dec. 23, 1988

[30] Foreign Application Priority Data

Dec. 23, 1987 [FR] France ............................ 87 17996

[51] Int. Cl.$^5$ .................... C08G 12/12; C08K 3/38; B32B 27/42
[52] U.S. Cl. .................................. 528/259; 528/260; 524/405; 524/597; 525/509; 428/106
[58] Field of Search ............... 528/260, 259; 525/509; 524/405, 597

[56] References Cited

U.S. PATENT DOCUMENTS 2,428,752 10/1947 Hewett .
3,896,087 7/1975 Brunnmueller et al. .
4,482,699 11/1984 Williams ............................ 528/260

FOREIGN PATENT DOCUMENTS 2825590.5 6/1979 Fed. Rep. of Germany .
2504542 10/1982 France .

OTHER PUBLICATIONS

Japan Appln. Abstract 58-147478(A), vol. 7, No. 263 (C-196) (1408), Nov. 24, 1983.

Primary Examiner—John C. Bleutge
Assistant Examiner—Vasu S. Jagannathan
Attorney, Agent, or Firm—Millen, White & Zelano

[57] ABSTRACT

Urea-formaldehyde resins, particularly useful for producing particle boards having lower rates of release of formaldehyde are synthesized in several stages including a stage of further condensing a first condensate having a F/U molar ratio of 1.8-2.3 and which was condensed at a pH of between 6 and 8. The further condensing is conducted at a pH of between 6 and 8 until a cloud point with water is reached at 10°-40° C. making it possible to obtain resins which are reactive and stable during storage.

15 Claims, No Drawings

PROCESS FOR THE MANUFACTURE OF UREA-FORMALDEHYDE RESINS

BACKGROUND OF THE INVENTION

The present invention relates to a new process for the manufacture of urea-formaldehyde resins; its subject matter is more particularly a new process for the manufacture of reactive urea-formaldehyde resins which are stable in storage and give off little formaldehyde.

Urea-formaldehyde resins are known products which are widely employed in the woodworking industry, in particular for the manufacture of particle boards. They are manufactured in a known manner by a condensation of urea and of formaldehyde at a pH of between 4 and 7 and at a temperature close to boiling point; this condensation reaction is preferably carried out in several stages.

The chief disadvantages of urea-formaldehyde resins is that they cause large quantities of free formaldehyde to be given off. Attempts have been made to reduce the free formaldehyde content by using various methods of manufacture; unfortunately, when the aim is to reach particularly low contents of formaldehyde, experience shows that this objective is accompanied both by a decrease in the reactivity and stability of the resins and by a deterioration in the mechanical properties of the finished boards. In order to get rid of free formaldehyde it has also been proposed to employ resins devoid of formaldehyde, particularly resins based on isocyanate solutions. Unfortunately, the problem of formaldehyde is replaced by that is isocyanates, whose effect on main is more harmful and more durable than that of formaldehyde, since the presence of free isocyanate groups has been demonstrated in the particle boards even several years after manufacture.

SUMMARY OF THE INVENTION

There is therefore a need to develop urea-formaldehyde resins with reduced contents of formaldehyde and with good stability together with good reactivity, and the use of which results in finished boards releasing little formaldehyde and exhibiting good mechanical properties.

The present invention relates to a process for the manufacture of urea-formaldehyde resins in several stages, characterized in that urea-formaldehyde resins which exhibit a final F/U molar ratio of between 0.85 and 1.35 are manufactured by condensing, in a first stage, a precondensate of urea and of formaldehyde with urea in such quantities that the F/U molar ratio at this stage is between 1.8 and 2.3, the condensation being carried out at reflux at a pH of between 6 and 8, the condensation being then continued in a second stage at an acidic pH of between 4 and 6 until the solution exhibits a cloud point with water at a temperature of between 10° and 40° C., formaldehyde being optionally added in a third stage in such quantity that the F/U molar ratio at this stage is between 1.8 and 3, at a pH of between 6 and 8, urea being optionally added at this stage so that the F/U molar ratio is between 0.85 and 1.35, the resin obtained at the end of the last stage or of the third stage being then optionally concentrated under vacuum so as to obtain a solids content of between 60 and 70% by weight; urea is then added in an optional fourth stage so that the F/U molar ratio is between 0.85 and 1.35.

According to another characteristic of the process forming the subject matter of the invention, it is possible to add a buffer agent, consisting particularly of borax, at the end of synthesis.

It has been found that the use of these operating conditions produced reactive urea formaldehyde resins which are stable in storage and which permit the manufacture of particle boards which exhibit low rates of release of formaldehyde combined with good mechanical properties.

The process of the present invention consists in carrying out, in a first stage, the condensation of a urea-formaldehyde precondensate with urea in such quantities that the F/U molar ratio at this stage is between 1.8 and 2.3, the condensation being carried out a reflux at a pH of between 6 and 8; in a known manner, the condensation temperature is between 40° and 80° C. The urea-formaldehyde precondensate used in this stage is, in a known manner, a precondensate which has an F/U molar ratio of between 4 and 10. The second stage of the process which is the subject matter of the invention consists in continuing the condensation at an acidic pH of between 4 and 6 until the solution exhibits a cloud point with water at a temperature between 10° and 40° C.; according to the invention, the cloud point of the resin is determined by making up a solution of one volume of resin and three volumes of water.

According to the process of the invention, a third stage is optionally used; during this stage formaldehyde is added in such quantity that the F/U molar ratio of the resin at this stage is between 1.8 and 3. This stage is conducted at a pH of between 6 and 8 and at a temperature of 40° to 80° C.; urea is then optionally added so that the F/U molar ratio at this stage is between 0.85 and 1.35. This addition of urea is also conducted at a pH of between 6 and 8 and with heating to a temperature of between 40° and 80° C. at most for one hour. The use of this third stage makes it possible to have available urea-formaldehyde resins which are still more reactive, while maintaining good stability. At the end of the second stage or of the optional third stage the resin is then concentrated under vacuum at a temperature not exceeding 70° C. so as to obtain a resin with a solids content of between 60 and 70%.

The process of the invention comprises an optional fourth stage after concentration of the resin, which consists in adding urea. This addition of urea, carried out at a temperature not exceeding 60° C. makes it possible to adjust the final F/U ratio of the resins obtained according to the process of the invention; according to the invention this ratio is between 0.85 and 1.35.

According to a last characteristic of the process of the invention, a buffer agent consisting particularly of borax may be added to the resin at the end of synthesis; the use of an agent of this kind makes it possible to obtain resins which maintain their reactivity during storage.

The following examples illustrate the present invention. All the quantities are expressed in parts by weight.

EXAMPLE 1

To provide an F/U molar ratio between 1.8 and 2.3, an appropriate amount of a urea-formaldehyde precondensate (formaldehyde=48.6%, urea=18.5%), followed by 654 parts of urea beads and 369 part of water, are charged into a reactor equipped with a stirrer, a condenser and a stirring device. After neutralization to pH=7.2, the mixture is brought up to reflux by moderate heating. The mixture is kept under reflux for 20 min at pH 7.2 before being acidified to pH=5.4. The progress of the condensation is followed by the change in viscosity, measured at 20° C. The condensation is stopped by raising the pH of the medium to 7 again when a viscosity of 700 mPa s is reached. The mixture is cooled to 60° C. and 349 g of urea-formaldehyde precondensate (formaldehyde=48.6%—urea=18.5%) are introduced. The mixture is kept for 10 min at 60° C. at pH=7 and is then concentrated under vacuum at 40° C. by distilling off 170 parts of water. 913 parts of solid urea and 3 g of borax are then added. The pH is adjusted to 9.2 and the mixture is stirred until all the urea has dissolved. The resin characteristics are summarized in Table 1.

EXAMPLE 2

The reaction is conducted as in Example 1, but after stopping the condensation no precondensate is introduced, the material is cooled to 40° C. and concentrated under vacuum at this temperature by distilling off 198 parts of water. 794 parts of solid urea and 3.6 g of borax are then added. The properties of the resin are summarized in Table 1.

EXAMPLE 3

Example 1 is repeated, but the condensation is stopped at a viscosity of 950 mPA s. After cooling to 60° C., 208 parts of formaldehyde at a concentration of 49.5% are added and the mixture is kept at 60° C. and at pH=6.8 for 8 min. After cooling to 40% it is concentrated under vacuum at this temperature by distilling off 326 parts of water, and 985 parts of urea beads and 3.9 parts of borax are then added. The pH is adjusted to 9.0 and the mixture is stirred until dissolution is complete. The properties are summarized in Table 1.

EXAMPLE 4

Example 3 is repeated but, after cooling to 60° C., 416 parts of formaldehyde at a concentration of 49.5% are added and the mixture is kept at 62° C. and pH=7.0 for 5 min. The synthesis of the resin is then continued as in Example 3, a quantity of 350 parts of distilled water being collected during the concentration and adding 1176 g of urea beads and 4.3 parts of borax. The properties are summarized in Table 1.

EXAMPLE 5

1300 g of urea-formaldehyde precondensate (containing 48.6% of formaldehyde and 18.5% of urea) are charged, followed by 430 parts of a urea solution (which has a concentration of 72%) and 59 parts of water. The mixture is neutralized to pH=7.0 with 10% strength sodium hydroxide and is then heated to reflux using moderate heating. After 10 min under reflux at pH=7.2, the mixture is acidified with 10% strength formic acid to pH=4.8. The condensation is continued until a viscosity of 680 mPa s (measured at 20° C.) is obtained. Condensation is stopped by adding dilute sodium hydroxide until pH=7.2. After cooling to 40° C., the mixture is concentrated under vacuum at 35° C. by distilling off 98 parts of water. 310 parts of urea beads and 2.3 parts of borax are then added and the material is mixed until dissolution is complete. The pH is adjusted to 9.0. The properties are summarized in Table 1.

EXAMPLE 6

2430 parts of urea-formaldehyde precondensate (containing 48.5% of formaldehyde and 20.1% of urea) are charged, followed by 416 parts of water and 694 parts of urea beads. The mixture is neutralized to pH=7.2 and is heated to reflux using moderate heating. After 25 min under reflux at pH=7.2, the mixture is acidified to pH=5.2. The condensation reaction is followed using the change in the cloud point temperature of a mixture of 3 volumes of water and one volume of condensate. The temperature of the mixture is lowered to 85° C. by cooling progressively while the stop test is approached. The condensation is stopped by raising the pH of the mixture to 7.0 again and by vigorous cooling when a cloud point temperature of 29° C. has been reached. The cooling is continued to 35° C. by applying vacuum to the reactor and the resin is then concentrated at this temperature by evaporating off 280 parts of water, 1044 g of urea beads and 4.3 g of borax are then introduced. After the reactants have dissolved completely the pH is adjusted to 9.0. The properties of the resin obtained are summarized in Table 1.

EXAMPLE 7

The beginning of the synthesis is identical with Example 6 but, after stopping the condensation the mixture is cooled to 60° C. and 1487 parts of urea-formaldehyde precondensate (formaldehyde=48.5%—urea=20.4%) are introduced. The mixture is kept for 10 min at pH=7.0 and is then cooled to 40° C. and then concentrated by evaporation of 142 parts of water under vacuum. 2268 parts of urea and 7.4 g of borax are added at ambient temperature; after these reactants have dissolved, the pH is adjusted to 9.0. The properties of the resin are summarized in Table 1.

EXAMPLE 8

This example is identical with Example 7, except that, after stopping the condensation, the quantity of urea-formaldehyde precondensate which is introduced is 561 parts. The water evaporated off during the concentration is 226 parts and the solid urea introduced after concentration 1440 parts. The properties of the resin are summarized in Table 1.

EXAMPLE 9

Example 7 is repeated using the following quantities:
precondensate after condensation: 1098 parts
water evaporated off under vacuum: 188 parts
solid urea added after concentration: 1820 parts.
The properties of the resin are summarized in Table 1.

EXAMPLE 10

1300 parts of urea-formaldehyde precondensate (F=47.5%—U=19.9%), 197 parts of water and 329 parts of urea beads are charged. The mixture is neutralized to pH=7.0. The mixture is heated to reflux with the aid of moderate heating. After 20 min under reflux at pH=6.8, the mixture is acidified to pH=5.0 and the condensation is continued until a cloud point (3 volumes of water/1 vol. of resin) is obtained at 28° C. 518 parts of urea-formaldehyde precondensate (F=47.5%—U=19.9%) are then introduced and the condensation is continued at 95° C. and at pH=5.1 until a viscosity of 860 mPa s is obtained. The pH is then raised again to 7.0 and the mixture is cooled to 60° C. 3.2 g of borax and 615 parts of urea beads are then introduced. The mixture is kept for 10 min at 64° C. at pH=0.8, it is then cooled by applying vacuum and the resin is concentrated by distillation under vacuum at 35° C.; 148 parts of water are collected. 308 parts of urea beads are then introduced. After cooling to 20° C. and complete dissolution of the urea the pH is adjusted to 9.0. The properties of the resin are summarized in Table 1.

EXAMPLE 11

2492 parts of urea-formaldehyde precondensate (F=47.4%—U=19.7%), 366 parts of water and 633 parts of urea beads are charged. The mixture is neutralized to pH=7.2 and is heated to 100° C. using moderate heating. After 10 min at 100° C. and pH=6.9, it is acidified to pH=5.1 and the condensation is conducted until a cloud point (1 volume of resin and 3 volumes of water) is obtained at 27° C. The pH of the mixture is then raised again to 6.90 and the latter is cooled to 60° C. After introduction of 990 parts of urea-formaldehyde precondensate (F=47.35%—U=19.7%) the mixture is kept at 60° C. and pH=6.5 for 10 min and 1175 parts of urea beads are then introduced while the mixture is kept for 10 min at 60° C. and pH=7.0, and it is then concentrated under vacuum at 32° C. by distilling off 251 g of water. 587 parts of urea beads and 6 parts of borax are then added. The pH is adjusted to 9.1 and the resin is cooled to 25° C. Stirring is continued until all the urea and borax have dissolved. The properties of the resin are summarized in Table 1.

EXAMPLE 12

Example 11 is repeated, except that a quantity of water of 831 parts is extracted during the concentration. The properties of the resin are summarized in Table 1.

EXAMPLE 13

910 parts of urea-formaldehyde precondensate (F=47.35%—U=19.7%), 162 parts of water and 330 parts of a 70% strength urea solution are charged. After neutralization to pH=7.2 the mixture is heated to reflux. The mixture is kept at pH=6.9 and is heated under reflux for 10 min. The mixture is then acidified to pH=4.6 and the progress of the condensation is followed by measuring the viscosity. The condensation is stopped when a value of 2000 mPa is obtained after the pH has been raised again to 7.0. After cooling to 65° C., 361 parts of urea-formaldehyde precondensate (F=47.35%—U=19.7%) and 429 g of urea beads are introduced. The mixture is kept for 30 min at 60° C. and pH=7.0. The resin is then concentrated under vacuum at 40° C. by distilling off 207 parts of water. 2.2 parts of borax and 215 parts of urea are then added. After these reactants have dissolved completely the mixture is cooled to 20° C. and the pH is adjusted to 9.1.

The properties of the resin are summarized in Table 1.

TABLE 1

| Example No. | Solids content (%) | Viscosity (mPa s) | pH | Gel at 80° C. (seconds) | Stability at 20° C. (days) |
| --- | --- | --- | --- | --- | --- |
| 1 | 64.7 | 450 | 9.0 | 143 | >53 |
| 2 | 63.6 | 770 | 9.1 | 167 | 25 |
| 3 | 65.7 | 830 | 9.0 | 142 | 48 |
| 4 | 65.3 | 420 | 8.9 | 138 | 77 |
| 5 | 64.8 | 220 | 9.0 | 144 | 75 |
| 6 | 65.4 | 440 | 9.0 | 142 | 105 |
| 7 | 64.7 | 110 | 8.9 | 110 | 33 |

TABLE 1-continued

| Example No. | Solids content (%) | Viscosity (mPa s) | pH | Gel at 80° C. (seconds) | Stability at 20° C. (days) |
| --- | --- | --- | --- | --- | --- |
| 8 | 64.1 | 180 | 9.0 | 126 | 77 |
| 9 | 64.0 | 120 | 8.9 | 119 | 85 |
| 10 | 65.9 | 230 | 8.9 | 139 | 97 |
| 11 | 65.5 | 200 | 9.1 | 125 | 100 |
| 12 | 72.6 | 790 | 9.1 | 121 | 45 |
| 13 | 65.5 | 260 | 9.1 | 130 | 101 |

EXAMPLE 15

The resins manufactured in Example 6 and 12 are employed for the manufacture of particle boards. Boards are manufactured in the following conditions:
Raw thickness: 20 mm
Adhesive coating: 7% of dry resin
Catalysis: 1.2% of ammonium chloride relative to the weight of the dry resin
Prepressing: 1 minute at a pressure of 5 daN/cm$^2$
Cure:
  Temperature: 180° C.
  Time: 4 minutes
  Pressure: 30 daN/cm$^2$ The properties of the boards are summarized in Table 2.

TABLE 2

| Resins | Example 6 | Example 11 |
| --- | --- | --- |
| Adhesive mixture | | |
| Viscosity (mPa s) | 68 | 96 |
| Gel 100° C. (seconds) | 78 | 85 |
| BOARDS | | |
| Density (kg/m$^3$) | 613 | 611 |
| Tensile (daN/cm$^2$) | 6.7 | 6.6 |
| Swelling % | 12.2 | 12.5 |
| Perforator formaldehyde (mg/100 g) | 8.7 | 8.6 |

The characteristics have been determined according to the following standards:
Thickness, density: NFB Standard 51222
Tensile V20: NFS Standard 51250
Swelling %: NFS Standard 51252
Formaldehyde content (perforator): EN Standard 120

We claim:
1. In a process for the manufacture of urea-formaldehyde resins from components consisting essentially of urea and formaldehyde, said process consisting essentially of condensing, in a first stage, a precondensate of urea and of formaldehyde with urea in such quantities that the F/U molar ratio at this stage is between 1.8 and 2.3, the condensation being carried out at a pH of between 6 and 8, the condensation being then continued in a second stage at an acidic pH of between 4 and 6 at least until the condensate solution exhibits a cloud point with water as determined at a volumetric ratio of said water to said condensate solution of 3:1, and terminating the pH 4–6 condensation within the cloud point range at a temperature of between 10° and 40° C., optionally adding formaldehyde in an optional third stage in such quantity that the F/U molar ratio at this stage is between 1.8 and 3, at a pH of between 6 and 8, and only if formaldehyde is added in said third stage, optionally adding urea at this stage so that the F/U molar ratio is between 0.85 and 1.35, the resin obtained at the end of the second stage or of the third stage being then option- ally concentrated under vacuum so as to obtain a solids content of between 60 and 70% by weight; adding urea in an optional fourth stage so that the F/U molar ratio is between 0.85 and 1.35, with the provision that if the third stage is omitted, the urea is added after the concentration step.

2. Process according to 1, characterized in that borax is added at the end of synthesis.

3. A process according to claim 1, comprising the third stage.

4. A process according to claim 1, comprising the vacuum concentration so as to obtain a solids content of between 60 and 70% by weight.

5. A process according to claim 1, comprising the fourth stage.

6. A process according to claim 3, comprising the fourth stage.

7. A process according to claim 3, wherein urea is added in the third stage to provide an F/U molar ratio of between 0.85 and 1.35.

8. A process according to claim 1, wherein the first stage is conducted at a condensation temperature between 40° C. and 80° C.

9. A process according to claim 3, wherein the third stage is conducted at a temperature between 40° C. and 80° C.

10. A process according to claim 7, wherein the addition of urea is conducted at a temperature of between 40° C. and 80° C.

11. A process according to claim 1, wherein the first stage is conducted at a pH of 6.8–7.2.

12. A process according to claim 1, wherein the pH of the second stage is conducted at a pH of 4.6–5.4.

13. A process according to claim 11, wherein the pH of the second stage is conducted at a pH of 4.6–5.4.

14. In a process for the manufacture of urea formaldehyde resins, comprising further condensing previously condensed material at an acidic pH of between 4 and 6, at least until the condensate solution exhibits a cloud point with water as determined at a temperature of between 10° and 40° C. and at a volumetric ratio of said water to said condensate solution of 3:1, said previously condensed material having been produced by condensing components consisting essentially of a precondensate of urea and of formaldehyde with urea in such quantities that the F/U molar ratio was between 1.8 and 2.3, the condensation having been carried out at a pH of between 6 and 7.2.

15. A process according to claim 14, wherein said acidic pH is 4.6–5.4.

* * * * *

UNITED STATES PATENT AND TRADEMARK OFFICE
CERTIFICATE OF CORRECTION

PATENT NO. : 5,034,500
DATED : 07/23/91
INVENTOR(S) : GARRIGUE et al.

It is certified that error appears in the above-identified patent and that said Letters Patent is hereby corrected as shown below:

TITLE PAGE, ABSTRACT OF THE DISCLOSURE

Line 6 - - - -

Change "between 6 and 8"

to read.....

"between 4 and 6"

Signed and Sealed this

Eighth Day of December, 1992

Attest:

DOUGLAS B. COMER

*Attesting Officer*    *Acting Commissioner of Patents and Trademarks*